United States Patent
Riedel (10) Patent No.: US 9,960,930 B2
(45) Date of Patent: May 1, 2018

(54) BUS NODE AND BUS SYSTEM AND METHOD FOR IDENTIFYING THE BUS NODES OF THE BUS SYSTEM

(71) Applicant: SMITHS HEIMANN GMBH, Wiesbaden (DE)

(72) Inventor: Ulrich Riedel, Mainz-Kastel (DE)

(73) Assignee: Smiths Heimann GmbH, Wiesbaden (DE)

( * ) Notice: Subject to any disclaimer, the term of this patent is extended or adjusted under 35 U.S.C. 154(b) by 217 days.

(21) Appl. No.: 14/763,301

(22) PCT Filed: Jan. 23, 2014

(86) PCT No.: PCT/EP2014/051323
§ 371 (c)(1),
(2) Date: Jul. 24, 2015

(87) PCT Pub. No.: WO2014/114713
PCT Pub. Date: Jul. 31, 2014

(65) Prior Publication Data
US 2016/0254925 A1 Sep. 1, 2016

(30) Foreign Application Priority Data
Jan. 24, 2013 (DE) .................. 10 2013 201 106

(51) Int. Cl.
*H04L 12/40* (2006.01)
*H04W 4/02* (2009.01)
(Continued)

(52) U.S. Cl.
CPC ...... *H04L 12/40019* (2013.01); *G06F 13/364* (2013.01); *G06F 13/4068* (2013.01);
(Continued)

(58) Field of Classification Search
CPC .............. G06F 13/364; G06F 13/4068; G06F 13/4086; G06F 13/4282; H04L 12/40013;
(Continued)

(56) References Cited

U.S. PATENT DOCUMENTS

2006/0088044 A1* 4/2006 Hammerl ............ G06F 12/0661
370/402
2011/0185093 A1* 7/2011 Matsuo ................. H04L 12/403
710/110

FOREIGN PATENT DOCUMENTS

DE 102007028926 10/2008
DE 1020080044777 3/2010
(Continued)

*Primary Examiner* — Tim T Vo
*Assistant Examiner* — Harry Wang
(74) *Attorney, Agent, or Firm* — Advent, LLP (57) ABSTRACT

A bus node, a communication unit, which can be coupled for communication to at least data line of a bus; having a bus node controller, which is coupled operationally to the communication unit; and having an identification unit, which has a quadripole connectable, instead of a direct connection, between an IDT input and an IDT output for an identification line and vice versa, the quadripole being configured such that upon a serial interconnection of a first bus node with at least one second bus node for the bus node controller, the position of the first bus node is identifiable on the basis of a comparison of the voltage at the IDT input with a predetermined threshold value, regardless of the number of second bus nodes.

6 Claims, 7 Drawing Sheets

(51) Int. Cl.
  *G06F 13/42*    (2006.01)
  *H04W 76/02*    (2009.01)
  *G06F 13/364*   (2006.01)
  *G06F 13/40*    (2006.01)
  *H04W 84/20*    (2009.01)

(52) U.S. Cl.
  CPC ...... *G06F 13/4086* (2013.01); *G06F 13/4282* (2013.01); *H04L 12/40013* (2013.01); *H04L 12/40078* (2013.01); *H04W 4/021* (2013.01); *H04W 76/02* (2013.01); *H04L 2012/40273* (2013.01); *H04W 84/20* (2013.01)

(58) Field of Classification Search
  CPC .. H04L 12/40078; H04W 4/021; H04W 76/02
  See application file for complete search history.

(56) References Cited

FOREIGN PATENT DOCUMENTS

| | | |
|---|---|---|
| DE | 102009045126 | 4/2011 |
| DE | 102010026431 | 1/2012 |
| EP | 1455278 | 9/2004 |
| EP | 2521041 | 11/2012 |

\* cited by examiner

BUS NODE AND BUS SYSTEM AND METHOD FOR IDENTIFYING THE BUS NODES OF THE BUS SYSTEM

TECHNICAL BACKGROUND

The present disclosure relates in general to the data exchange between various components of a technical system. In particular, the present disclosure relates to the cross-linking and configuration of various components of a technical system, in order to enable a data exchange among the components.

Technical systems, machines or devices increasingly comprise many electronic components, such as control units, sensors, and actuators. For an intended function of the device, often not only is communication of individual components with a central control unit necessary, but also communication of the components with one another. In principle, the components can be connected for this purpose to one another by means of proprietary communication lines, and thus cross-linked or interconnected with one another. This necessitates at least one line from the central control unit to each sensor and actuator (parallel wiring). With an increasing degree of automation of a system, machine, or device, the cabling effort and expense increase, given parallel wiring, because of the greater number of input/output points. This results in major effort and expense in terms of planning, installation, putting into operation, and maintenance.

It is known for the components to be cross-linked or interconnected to be connected serially by means of a so-called communication bus. To that end, all that is required is to make a connection, which is moved onward at each component (serial wiring). Thus the communication bus replaces the parallel bundle of lines with a single bus cable, which connects the individual components as a bus participant (bus node).

For this kind of serial cross-linking or interconnecting of the components, numerous network and bus technologies are known. One known example, which was originally developed for the motor vehicle field, is the Controller Area Network (CAN) bus. Physical facts about the CAN bus and other bus protocols, such as the Profibus are standardized internationally in ISO 11898, which defines Layer 1 (physical layer) and Layer 2 (data security layer) in the ISO/OSI reference model. CANopen is a further development; it is a Layer-7 communications protocol based on CAN. CANopen has been maintained since 1995 by CAN in Automation and has meanwhile been standardized as European standard EN 50325-4.

So that a communication or data exchange can function on the bus, the individual bus participant must be uniquely identifiable and thus also addressable. A further requirement of serial bus systems is that the bus must be terminated (bus termination) on the physical plane at each of its ends by means of termination resistors. All this requires careful planning and complicated and expensive implementation.

CAN bus systems known at present require a complicated configuration for each switch (such as a DIP switch) or so-called jumpers, by means of which each component connected to the bus is assigned a unique address or ID, and the requisite bus termination is activated at the component forming one of the bus ends.

The bus configuration must be defined when the system is assembled and can be changed or adapted, for instance if a further component is to be added, only at major effort and expense.

DE 10 2008 044 777 A1 discloses a method for addressing the participants of a bus system, having a control unit, a bus originating at the control unit, and a plurality of addressable participants, which are connected to the bus; the control unit feeds an identifying current to the participants; the identifying current is carried each via a respective electrical resistor that is assigned to a participant not yet addressed; each participant determines the voltage drop at the associated resistor; and for the sake of addressing, the participants are assigned an address, the voltage value of which address is distinguished from the voltage values of the other participants by a predeterminable threshold value, and the addressed participants short-circuit the associated resistor.

DE 10 2009 045 126 A1 discloses units, integrated in a communications assembly, of which each comprises one position recognizing unit, that decides on the basis of received and sent position-recognizing signals on a peripheral position or an internal position of the associated unit, and in the case of a peripheral position, it performs a termination.

SUMMARY

The present disclosure describes a flexible capability that is simple and economical to produce, to enable a data exchange between various components of a device.

Techniques are described that facilitate adjustment of the bus node ID or bus node address and optionally the bus termination of a bus node based on the cabling of the bus or the position of the respective bus node in the bus, via the bus in a bus initialization phase. In other words, each bus node, upon initialization of the bus, is allocated an identifier (ID or address) via the bus, and if the bus node is the last in the chain of bus nodes, its terminator or termination resistor is activated. As a result, the complicated configuration of the bus node ID and, if applicable, of the terminator resistor of the individual bus nodes of the bus system by means of jumpers and/or DIP switches can be avoided.

A first aspect relates to a bus node, comprising: a communication unit, which can be coupled for communication with at least one data line of a communication bus; a bus node controller, which is coupled operationally with the communication unit; and an identification unit, which is coupled operationally to the bus node controller and is configured for signaling a time for an exchange of messages assigned to the bus node with a bus master, the signaling being done to the respective bus node controller by means of the bus master, for the purpose of allocating a unique identifier (ID or address).

In the identification unit, selectively instead of a direct connection between an IDT input and an IDT output for an identification line (IDT), a two-port network or quadripole can be connected in between. In other words, the identification unit can loop through the identification line of the bus node. The quadripole is configured such that in the case of a serial interconnection of a first bus node to at least one second bus node for the bus node controller, the position of the first bus node can be identified on the basis of a comparison of the voltage at the IDT input with a predetermined threshold voltage, regardless of the number of second bus nodes.

In an advantageous refinement, the bus node moreover has a bus termination unit that is switchable or activatable by the bus node controller, for each of the at least one communication line. In the simplest case, the bus termination unit comprises an ohmic resistor or RC element, with which the respective communication line can be terminated without reflection, in accordance with its wave resistance. It is also possible that the bus termination unit is an active circuit, for instance a regulated voltage source, by means of which a resting level on the respective communication line is maintained.

According to a particular embodiment, the quadripole is a symmetrical quadripole in the form of a T-circuit of three resistors connected in the form of a T. Because of the symmetrical construction, there is no need to use a particular direction of installation direction in the bus system; this also makes for easier installation in systems, machines, or devices. A first resistor and a second resistor are embodied so as to be serially interconnectable to the identification line (IDT), and a third resistor is interconnectable between the middle of the T-circuit, formed by the connection point between the first and second resistors, and the reference potential (GND).

Along with the known functionalities of a bus node, for the version proposed here these bus nodes are additionally arranged so as to make a first signal, corresponding to a first voltage at the IDT input, available to the bus node controller. As a result, the bus node controller can further be arranged, in an initialization phase as soon as the first signal indicates that the first voltage is greater than the predetermined threshold value, to send a first message to a bus master by means of the communication unit of the bus node via the at least one communication line. In other words, it is possible for the bus node controller by itself, on the basis of the first signal, to detect a time at which precisely that bus node should begin an exchange of messages with the bus master, in order to obtain a unique identifier for future communication on the communication bus. To that end, the bus node controller is further arranged for subsequently receiving a second message from the bus master over the at least one communication line, which message contains the unique identifier for the bus node. Consequently, the bus node can then, using the identifier, communicate via the communication bus and in particular is addressable, that is, directly, by means of this identifier.

In a refinement, the bus node is arranged for making a second signal, corresponding to a second voltage at the IDT output, and a third signal, corresponding to a third voltage at the center of the T-circuit, available to the bus node controller. As a result, the bus node controller can further be arranged for recognizing that this bus node forms one end of the communication bus. The bus node controller can recognize this from the fact that the second signal and the third signal indicate that the second voltage and the third voltage are substantially identical. This means that the IDT output of the bus node is unconnected, and thus is open. Accordingly, the bus node controller can be arranged for activating the bus termination unit for each of the at least one communication line. Thus upon the initialization of the communication bus, it can also be ensured automatically that the bus is correctly terminated at its end opposite the bus master.

Based on the possibility of recognizing the bus end, the bus node controller can further be arranged for inserting information to that effect into the first message to the bus master. This can be implemented in an especially simple way with a bit, i.e. a flag, in the first message that indicates that the bus node is located at one end of the communication bus.

A second aspect relates to a bus system, which has at least two bus nodes in accordance with the first aspect.

A third aspect relates to a method for identification, in particular successively, of the bus nodes of a bus system having bus nodes in accordance with the first aspect. In it, a bus node forming one end of the bus system and being configured as a master sends an identifier to at least one further bus node, as a slave, by means of the following steps:

(a) First, the master puts the bus nodes (connected to the bus system) in an initialization state; this can be done in an especially simple way for instance by varying the voltage level on the identification line, for instance by pulling the voltage level to a reference potential such as 0V, or in other words ground (GND).

(b) Next, optionally after a predetermined length of time, to give the bus node time to set up the initialization state, the master couples the identification line (IDT) to a predetermined voltage level; this can be done for instance by connecting the identification line in the master to a voltage source having a predetermined voltage level and internal resistance. If the master as well is a bus node in accordance with the first aspect, then the voltage coupling of the identification line can be done via a point in the switched-on quadripole. If the quadripole is configured as a symmetrical resistance network, a center point of the circuit is suitable as an input point for the voltage, since then in principle the IDT input and IDT output on the master and slave bus node, respectively, can be used arbitrarily.

(c) After that, the master waits to receive a first message from one of the further bus nodes on the at least one communication line; the version presented here ensures that on the bus, the bus node that recognizes that the time for its allocation of an identifier has arrived is always the bus node that is currently located closest to the master on the bus, and that bus node is where the quadripole in the identification unit is connected into the identification line.

(d) After that, the master sends a second message to the further bus node, from which the first message came; this second message contains the identifier for this bus node; that is, since the master "knows" that the identifiers have been issued successively from the bus node located closest to the master on the bus to the bus node on the other end of the bus, the identifiers to be issued or that have been issued to the bus nodes can be located uniquely on the bus; that is, they can be assigned one position on the bus. An assignment of a respective bus node identifier and the functionality or modality (sensor, actuator, control unit, etc.) connected to the bus node can for instance be done by means of a piece of information additionally contained in the respective first message, or after the bus initialization, by means of a communication that conforms to the respective definitive communications protocol, via the at least one communication line.

(e) If the further bus node is located on the other end of the bus system, then the master terminates the identification process; otherwise, it repeats the above steps beginning at step (c).

In a refinement of the method in accordance with the third aspect, the master can ascertain in step (c) whether the second bus node is located on the other end of the bus system. For instance, the master can take this information about an indicator in the first message from the bus node that is currently communicating with the master. A further possibility is that the master recognizes this information itself on the basis of the voltage level on the identification line (IDT); as soon as the last bus node, which thus forms the end of the bus, has received its identifier, it likewise makes a direct connection between the IDT input and the IDT output for the identification line. Consequently, the identification line is looped through to the end of the bus and is unconnected there, and the voltage level on the identification line will rise to the level of the predetermined voltage coupled from the master.

A fourth aspect relates to a method for receiving an identifier at a bus node of a bus system having bus nodes in accordance with the first aspect. In it, one bus node, forming one end of the bus system, is configured as a master, and at least one further bus node, as a slave, receives an identifier from the master by means of the following steps:

(i) First, the further bus node, in reaction to recognizing an initialization state for the communication bus, connects its identification unit, instead of a direct connection, between the IDT input and the IDT output for the identification line (IDT); as explained above in connection with the corresponding method in accordance with the third aspect, the further bus node can recognize the initialization state on the basis of a predetermined voltage level or a predetermined change in the voltage level on the identification line. In the case of a plurality of further bus nodes, the identification units are connected into the identification line in all the bus nodes at the onset of the issuance of the identifier.

(ii) The bus node or the bus node controller of the bus node then monitors the voltage level on the identification line at the IDT input. As soon as a predetermined voltage level is detected at this IDT input, the bus node controller of the further bus node recognizes that the time has come when precisely that bus node is allowed to communicate with the master in order to receive its identifier. For that purpose, first the bus node controller of the further bus node, by means of the communication unit on the at least one communication line, sends a first message to the master, and by means of this first message, the master learns that a further bus node is now waiting for the allocation of an identifier; that is, in accordance with the corresponding method in the third aspect, the master can then send the second message on the communication bus, which, because at that time only this one further bus node is receiving messages, is aimed precisely at this further bus node. Thus, thanks to the embodiment presented here, the master can communicate with a slave, even though the slave does not yet have its own address or identifier.

(iii) The further bus node receives the second message, which contains a unique identifier for that bus node; the identifier can then be deposited or stored in memory in the bus node controller or the communication unit and is thus available for future communication on the communication bus.

(iv) Finally, the bus node controller connects the direct connection again, instead of the identification unit, between the IDT input and the IDT output for the identification line (IDT); as a result, it is automatically ensured that the voltage level of any further bus node that follows can rise to or above the predetermined voltage level, and that further bus node can carry out the exchange of messages with the master for issuing an identifier.

In a refinement of the method in accordance with the fourth aspect, the bus node controller, in step (ii), can insert an indicator, according to which the second bus node is located at the other end of the bus system, into the first message, or set a flag provided for that purpose in the message, if the IDT output is unconnected; the bus node controller can ascertain this for instance by monitoring the voltage level at the IDT output.

In a refinement of the method in accordance with the fourth aspect, if the bus node has a bus termination unit, the bus node controller in step (ii) can turn on or activate the bus termination unit for each of the at least one communication line; since—as explained above—the bus node controller can ascertain when the bus node is located at one end of the communication bus, this information can be utilized for an automatic bus termination functionality of a bus node.

The aspects explained above are especially suitable for expanding a known bus system, such as the known Controller Area Network (CAN) bus system, for instance, which is specified in ISO 11898, with the functionality of the "bus initialization" explained, and optionally the "independent bus termination" as well.

The herein disclosed solution is especially suitable for an especially easy-to-configure cross-linking or interconnecting of components of a technical system, machine or device, such as the electrical components of an X-ray inspection system. Individual components of the X-ray inspection system, such as control units, sensors and actuators, can be connected as bus nodes by means of a communication bus. With regard to the bus node properties, the components can then be configured in accordance with the version proposed here. It is then especially simple to allocate an identifier (address or ID) to the bus node and to terminate the bus automatically correctly.

The method explained in conjunction with the third and fourth aspects for issuing an identifier and an independent bus termination can in principle be implemented by means of suitable electrical circuit provisions, preferably in combination with a corresponding control program in a programmable circuit, for instance in a programmable microcontroller, such as a P8xC592 or P8xCE598 from NXP (formerly Philips), in which the bus node controller can be implemented.

In other words, the method can be implemented by means of a software program in the respective microcontroller of the bus node, which then, as the central bus node, has the function of a master and in the further bus node that has the function of a slave. This microcontroller implementing the bus node control should then be configured essentially for performing the above-described method, or in other words programmed for that. Such a microcontroller is constructed in a known manner on the order of a computer system; that is, there is a processor with a central arithmetic unit and internal memory, or external memory as well, which can be embodied as nonvolatile for the software and as a RAM-type (Random Access Memory) for working data. For interaction with the components of the bus node such as the communication unit or identification unit and with the functionality or modality (actuator, sensor, etc.) bound to the respective bus node, such a microcontroller has corresponding interfaces, by way of which data can be output or received as needed by the microcontroller.

Alternatively to the implementation by means of a programmable microcontroller, it is also conceivable for the necessary steps or provisions of the method to be implemented directly by means of a corresponding digital electronic circuit, for instance by means of a hard-wired logic or a configurable logic. Such an electronic circuit can be implemented in an especially flexible way by means of an integrated circuit in digital technology, into which a desired logic circuit can be programmed. That is, for integration of one of the methods, a programmable logic component, such as a PLD (Programmable Logic Device) or an FPGA (Field Programmable Gated Array) could also be used, which then as an additional functionality expands the bus node with corresponding binding to the other components, such as the bus node controller, communication unit, and identification unit.

Thus, as an alternative to implementation by means of a computer program for a microcontroller, the implementation of the method can be done by means of a specific configuration, that is, a configuration program or a configuration file, of one or more flexibly programmable logic components. Unlike with the programming of a microcontroller as an example of a computer implementation, the term "program" then relates only secondarily to the issuing of chronological courses in the component; it refers primarily to the definition of its functional structure. By the programming of structural regulations, the fundamental mode of operation of individual, universal blocks in the logic component and their interconnection to one another is fixed, or in other words configured.

BRIEF DESCRIPTION OF THE DRAWING FIGURES

Further advantageous embodiments and example embodiments relating to them will be described in further detail below in conjunction with the appended drawing figures. Component parts or components with similar function are in some cases identified by the same reference symbols. The terms "left", "right", "top", and "bottom" used in a description of the exemplary embodiment refer to the drawing figures in an orientation in which the captions and reference symbols can be read normally.

DETAILED DESCRIPTION OF THE EXEMPLARY EMBODIMENTS

In the ensuing description, numerous specific details are described. However, it is understood that refinements are possible even without these specific details. Circuits, structures, and method known to one skilled in the art are not addressed in detail here, in order not to unnecessarily make the present description harder to understand.

In the ensuing description and in the claims, the terms "coupled" and "connected" and terms derived from them are used. It is understood that these terms are not to be considered synonyms. In specific embodiments, instead, "connected" can indicate that two or more elements are in direct physical or electrical contact with one another. "Coupled" can mean that two or more elements cooperate or affect one another; they may be in direct or indirect physical or electrical contact with one another.

The term "processor" can relate to an arbitrary device or part of a device that processes electronic data from registers and/or a memory in order to convert the applicable electronic data into different electronic data that can be stored in registers and/or a memory. A "computer platform" can include one processor or a plurality of processors.

Unless otherwise noted, in the present context the use of the ordinal adjectives "first", "second", "third", and so forth to designate a common object merely means that this relates to various examples of identical kinds of objects and is not intended to imply that the thus-designated objects must occur in a particular chronological, spatial, ranking, or other kind of order.

Various embodiments can be implemented in a single form of hardware, firmware, and software, or a combination. Alternatively or in addition, embodiments may be implemented entirely or in part as instructions stored on a machine-readable medium, which can be read out by a computer platform or a microcontroller and executed in order to perform the operations described here. A machine-readable medium can be an arbitrary mechanism for storing, transmitting, or receiving information in a form that is readable by a machine (such as a computer). The machine-readable medium can for example be a read-only memory (ROM), a random access memory (RAM), a magnetic memory plate, an optimal memory medium, a flash memory device, as well as signals forwarded optically, acoustically or in some other manner (such as carrier waves, infrared signals, digital signals, etc.), the interfaces and/or antennas that send and/or receive these signals, and so forth.

Figure 1:
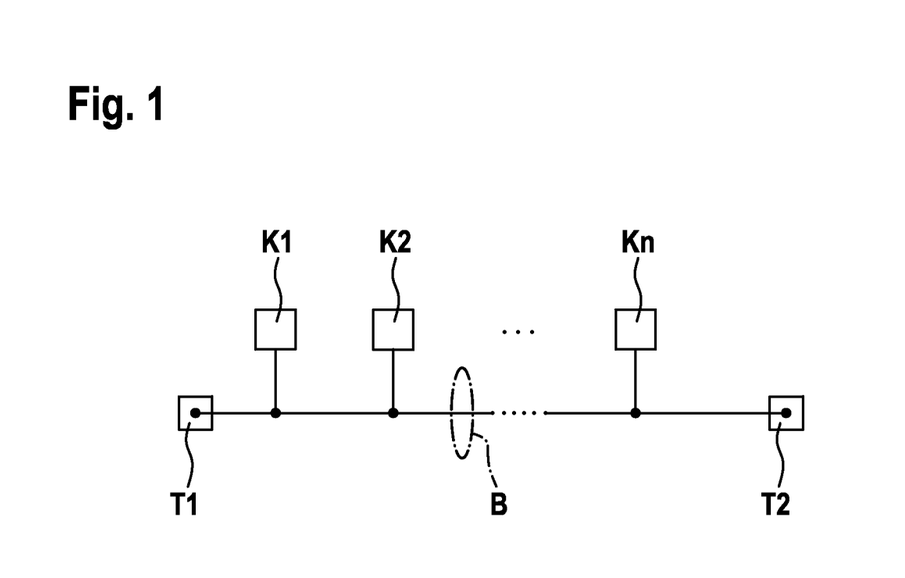
FIG. 1 illustrates the fundamental construction of a bus system.

FIG. 1 illustrates the fundamental construction of a bus system. In principle, a bus system can have the most various physical topologies. For the version presented here for simplifying the bus configuration, which in particular enables automatic location-related identification of the bus participants, that is, the individual bus nodes, a bus system with linear topology is preferred. FIG. 1 shows a communication bus B to the plurality of components of a system, machine, or device as bus participants K1, K2, . . . , Kn are connected as bus nodes. Reflections at the line ends of the communication bus B are prevented (bus termination) by suitable bus terminations T1 and T2 at the ends of the bus. This termination can in principle be done by means of a suitable termination resistor or an RC element, or as active termination with a corresponding voltage regulator, which specifies the repose level on the associated bus line.

Until now, in systems, machines, or devices, the components have typically been connected manually by means of a suitable bus system. However, at present this requires a complicated configuration of the bus nodes per switch or the setting of jumpers. This configuration is fixed when the system is assembled and can be altered/adapted later only with effort and expense.

Figure 2:
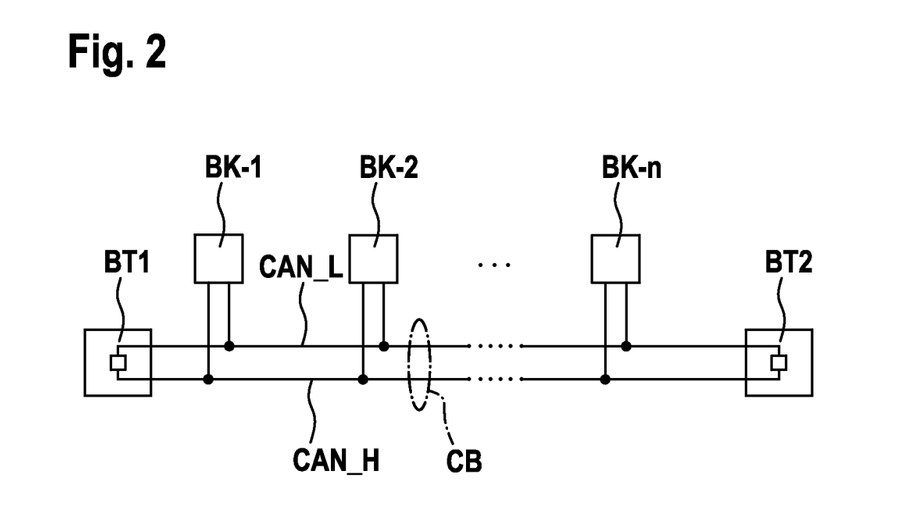
FIG. 2 schematically illustrates the fundamental construction of a bus system on the Controller Area Network standard.

FIG. 2 schematically illustrates the fundamental construction of a bus system on the Controller Area Network standard, which is defined for instance in ISO 11989. For easier comprehension, in the ensuing description of the exemplary embodiments the CAN bus is used as the bus system. However, it is understood that the herein disclosed principle can be adopted for other bus systems as well. In other words, the disclosure is not limited to a CAN bus and to CAN bus nodes arranged accordingly.

The CAN bus CB in FIG. 2 essentially comprises two differentially triggered communication lines CAN_L and CAN_H. Upon a communication, a negated CAN signal (dominant low) is transmitted on the line CAN_L, and a positive CAN signal (dominant high) is transmitted on the line CAN_H. In principle, the CAN bus CB can also have further lines (not shown in FIG. 2), such as a line CAN-GND (ground) for furnishing a reference potential to all the bus participants. Optionally, a line VCC for furnishing a supply voltage, a line GND for furnishing a device ground or in other words a reference potential to the device components connected to the respective bus node, and the shielding of the bus cable CAN-SHLD can also be present in the bus cabling. At the bus ends, the CAN bus CB is terminated each by means of a termination resistor, for instance, at 120 ohms as bus terminations BT1 and BT2.

On the CAN bus, a communication in accordance with "CANopen"—a CAN-based communications protocol—can for instance be used, which is especially suitable for cross-linking or interconnecting within complex devices. CANopen has been kept up since 1995 by the organization called "CAN in Automation (CiA)" and is standardized as European standard EN 50325-4.

In CANopen, when a CAN bus device sends a message, it does so in the expectation posture that there is a receiver. In other words, each bus participant requires a unique identifier (ID or address) for identification, so that a CAN bus device can send a message to a particular receiver. This requires knowledge of the respective bus node identifier, in order to send the message to a particular node. For the CANopen protocol, it is therefore provided, among other things, that each bus participant (bus node) is allocated an identifier (node ID or node address). The here presented solution furnishes a possibility of doing this very simply, quasi-automatically.

Figure 3:
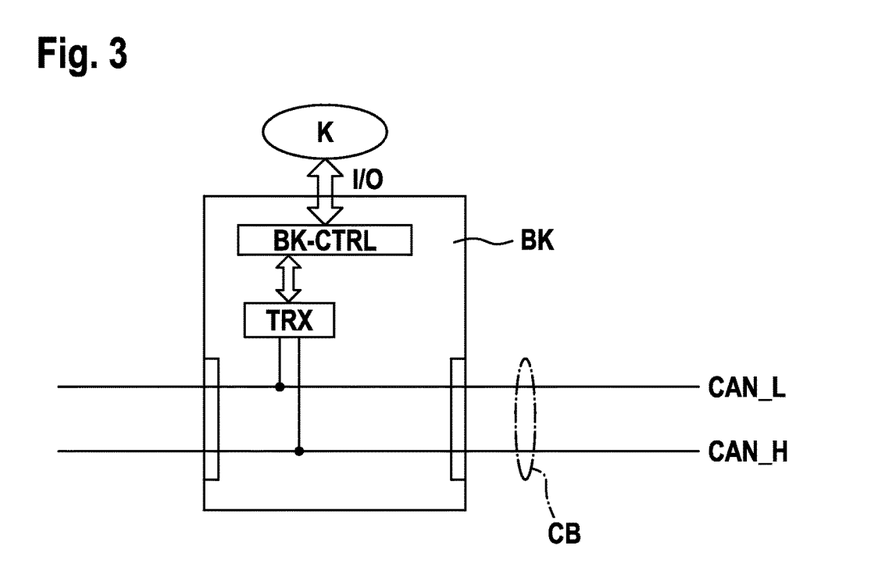
FIG. 3 schematically illustrates the basic construction of a CAN bus node, which serves as a communications interface with the CAN bus for a component of a system, machine or device.

FIG. 3 schematically illustrates the basic construction of a CAN bus node, which serves as a communications interface with the CAN bus for a component of a system, machine or device. Essentially, the bus node BK has a communication unit TRX, which for communication can be coupled to the data lines CAN_L and CAN_H of the communication bus CB; this can for instance be a CAN bus control interface component, such as PCA82C250T made by NXP (formerly Philips). The bus node BK further has a bus node controller BK-CTRL, which is coupled operationally to the communication unit TRX; this can for instance be the aforementioned microcontroller with on-chip CAN P8xC592 made by NXP (formerly Philips).

Figure 4:
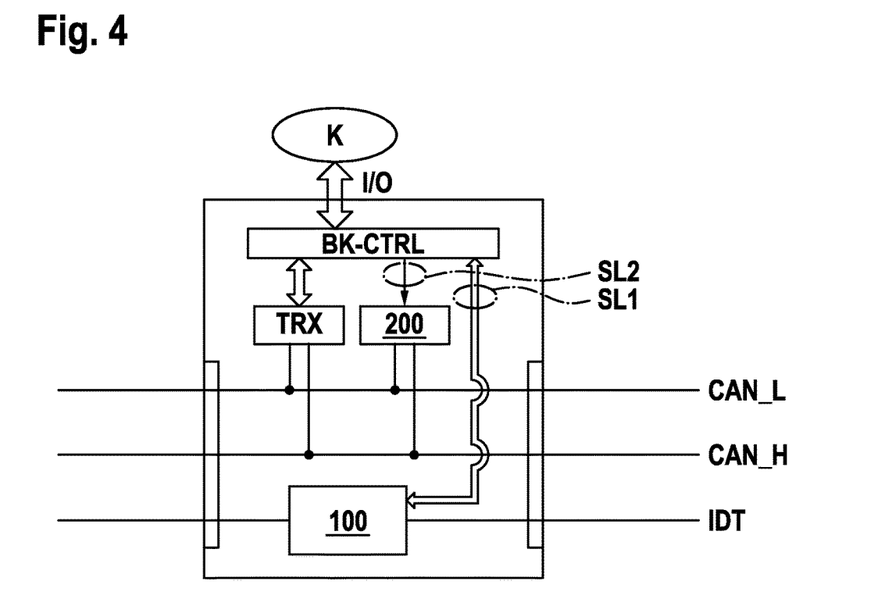
FIG. 4 schematically illustrates the basic construction of a CAN bus node that, which according to a first aspect, has an identification unit for connection to an identification line and also has a bus termination unit.

FIG. 4 now in comparison to the known bus node of FIG. 3 schematically illustrates the basic construction of a CAN bus node that, in accordance with a first aspect, has an identification unit 100 for connection to an identification line as well as a bus termination unit 200. The bus node controller BK-CTRL is connected operationally, by means of respective input and/or control lines SL1, SL2, to the identification unit 100 and to the bus termination unit 200.

Figure 5:
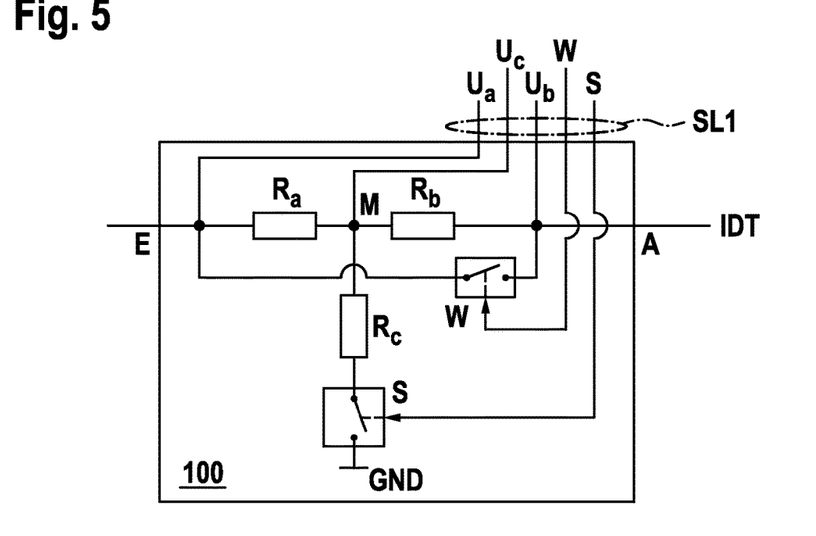
FIG. 5 schematically shows one possible embodiment of an identification unit.

FIG. 5 schematically shows one possible embodiment of an identification unit, which is coupled operationally to the bus node controller BK-CTRL (FIG. 4) via input and/or control lines SL1.

By means of the identification unit 100, instead of a direct connection between an IDT input E and an IDT output A for the identification line identification unit, it is possible for a quadripole to be selectively interposed between them.

According to the embodiment, this quadripole is configured as an electrical circuit, in such a way that in a serial interconnection of the identification line from a first bus node to at least one second bus node for the bus node controller BK-CTRL, the position of the first bus node is identifiable from a comparison of the voltage at the IDT input E with a predetermined threshold value Us, regardless of the number of second bus nodes.

FIG. 5 shows one possible exemplary embodiment for a quadripole that meets the above requirements. The quadripole is a passive resistor network having at least one ohmic resistor Ra or Rb, which can be interconnected serially with the identification line identification unit, and having at least one ohmic resistor Rc that can be interconnected between the identification line identification unit and a reference potential GND.

The quadripole of the embodiment shown in FIG. 5 is a symmetrical quadripole and is formed as a T-circuit comprising three resistors Ra, Rb, Rc interconnected in the form of a T. The first resistor Ra and the second resistor Rb are serially interconnectable into the identification line identification unit. The third resistor Rc is interconnectable between the middle of the T-circuit, formed by the connection point between the first and second resistors Ra, Rb, and the reference potential (GND).

The "interconnection" is done by suitably triggering the switches W and S. To establish a direct connection between the IDT input and the IDT output, the switch W has to be closed (that is, W=1), and the switch S has to be open (that is, S=0). If the T-circuit of the resistors Ra, Rb, Rc is to be connected into the identification line, then the switch W has to be open (W=0) and the switch S has to be closed (S=1).

Figure 6:
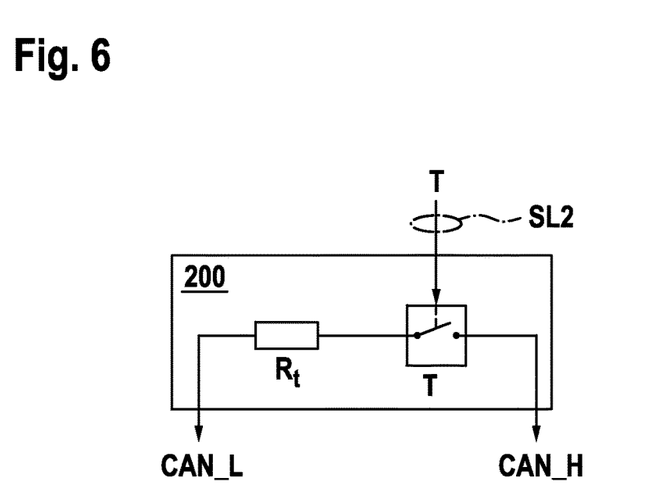
FIG. 6 schematically shows one possible embodiment of a bus termination unit.

FIG. 6 schematically shows one possible embodiment of a bus termination unit 200. In the context of the application environment of a CAN bus chosen here for description, the bus termination unit 200 comprises a termination resistor Rt at 120 ohms, which can be connected between the two communication lines CAN_L and CAN_H by means of a switch T that is actuatable by the bus control BK-CTRL via the input and/or control line SL2.

Figure 7:
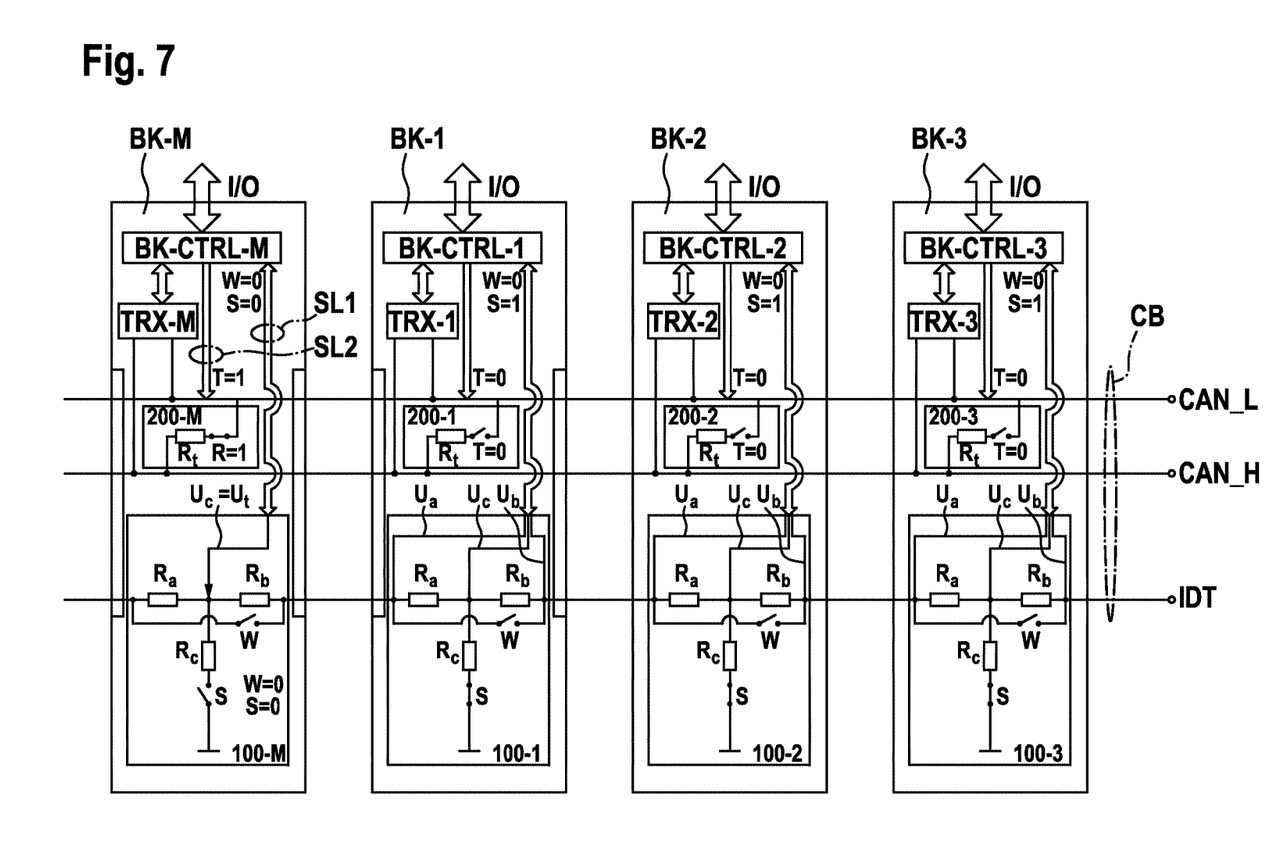
FIG. 7, to illustrate the issuance of an ID to bus nodes, shows a CAN bus with a master bus node and three slave bus nodes; the identification units of all the bus nodes are shown in the initialization state, at the onset of the issuing of an identifier by the master.

FIG. 7, to illustrate the issuance of an ID to bus nodes, shows a CAN bus CB with a master bus node BK-M and three slave bus nodes BK-1, BK-2, BK-3. The identification units 100-M, 100-1, 100-2, 100-3 of all the bus nodes are shown in the initialization state, at the onset of the issuing of an identifier by the master BK-M. That is, the respective quadripole in the identification units 100-1, 100-2, 100-3 is connected into the identification line identification unit at all the slave bus nodes BK-1, BK-2, BK-3; for that purpose, in all the identification units, the switches W are each opened (W=0) and the switches S are each closed (S=1). Moreover, at all the slave bus nodes BK-1, BK-2, BK-3, the bus termination unit 200-1, 200-2, 200-3 is deactivated (that is, T=0).

Since the master bus node BK-M forms one end of the CAN bus CB, the bus termination unit 200-M of the master BK-M is already activated (that is, T=1).

The master bus node BK-M is constructed fundamentally identically to the slave bus node. To enable coupling the identification line at a predetermined voltage, the bus controller BK-CTRL-M can apply an appropriate voltage, via the input and/or control lines SL1, to the middle of the T-circuit of the identification unit 100-M.

FIGS. 8a through 8d illustrate the principle of successively proceeding identifier allocation to the various bus nodes BK-1, . . . , BK-3, beginning with the bus node BK-1 closest to the master BK-M and extending to the bus node BK-3 on the end of the bus located opposite the master BK-M.

For a clear and simplified illustration, in each of FIGS. 8a through 8d, only the identification unit 100-M, 100-1, . . . , 100-3 is shown, depicting the associated switch positions for the various switches S and W as well as the resultant state in terms of circuitry. In other words, if because of the current switch position of the switches S and W the T-circuit of the three resistors Ra, Rb, Rc in the associated identification unit is connected into the identification line, then the T-circuit is shown accordingly, and otherwise the direct connection between the IDT input and the IDT output is shown.

Figure 9:
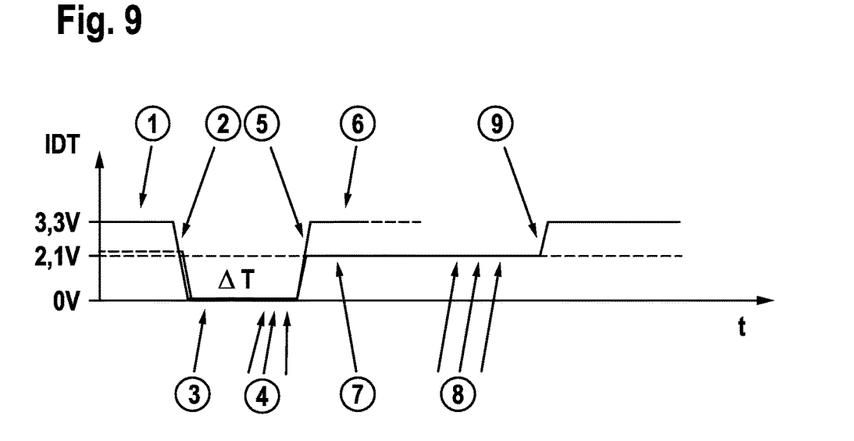
FIG. 9 is a voltage level diagram, which illustrates the voltage level on the identification line.

FIG. 9 is a voltage level diagram, which illustrates the voltage level on the identification line identification unit over the time t during the bus initialization. In the diagram, circled points # are shown, to which reference will be made hereinafter at the appropriate place.

For the sake of describing the function of the here disclosed methods clearly, it will be assumed that in the master bus node BK-M, work is done with a feed voltage for the identification line identification unit of 3.3V. It is also assumed that Ra=Rb=Rc=R applies. In the ensuing description of the course upon bus initialization, the following abbreviations will be used: T=switch for terminator (that is, T=1 when the bus termination unit is active, T=0 when the bus termination unit is deactivated), W=switch for the T-circuit bridge, that is, the direct connection from the IDT input to the IDT output of an identification unit; S=switch for the T-circuit pull-down resistor Rc, that is, for the connection from the T-circuit middle M to the reference potential via the resistor Rc; Ua=the respective voltage on the identification line at the IDT input (to the left of the identification unit); Ub=the respective voltage on the identification line at the IDT output (to the right of the identification unit); and Uc=the respective voltage at the T-circuit center, that is, at the connection point M (FIG. 5) between Ra and Rb.

In the master bus node BK-M, under the control of the bus node controller BK-CTRL-M, the following then takes place: At the beginning, the voltage level on the identification line identification unit is undefined (number 1 in FIG. 9). Therefore the master bus node controller BK-CTRL-M first puts the switch T in the master in the "off" or "opened" state (T=0), the switch W in the "off" or "opened" state (W=0), and the switch S in the "on" or "closed" state (S=1); thus the voltage level of the identification line identification unit is pulled via the T-circuit pull down resistor Rc to 0V (number 2 in FIG. 9). This serves to signal the start of the bus initialization phase to the slave bus nodes BK-1, BK-2, BK-3. For the initialization of the further bus nodes, the master BK-M waits for a period of time ΔT (number 4 in FIG. 9).

Figure 8A:
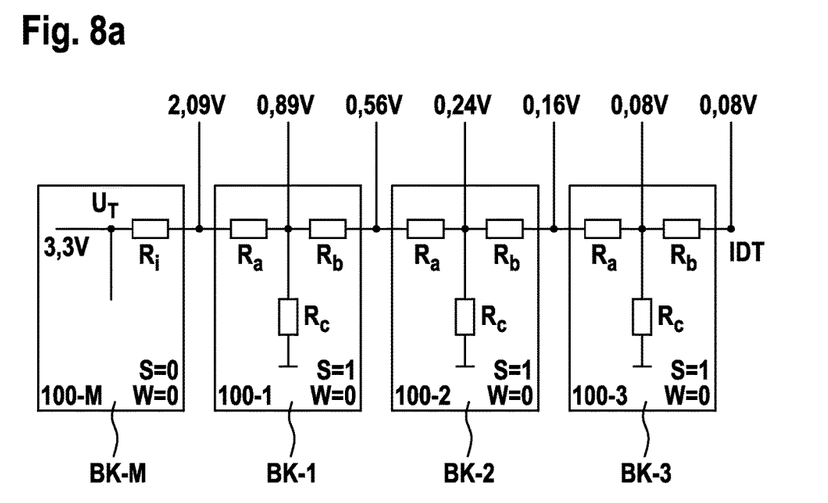
FIGS. 8*a* through 8*d* illustrate the principle of successively proceeding identifier allocation to the various bus nodes, beginning with the bus node closest to the master and extending to the bus node on the end of the bus opposite from that of the master.
Figure 8B:
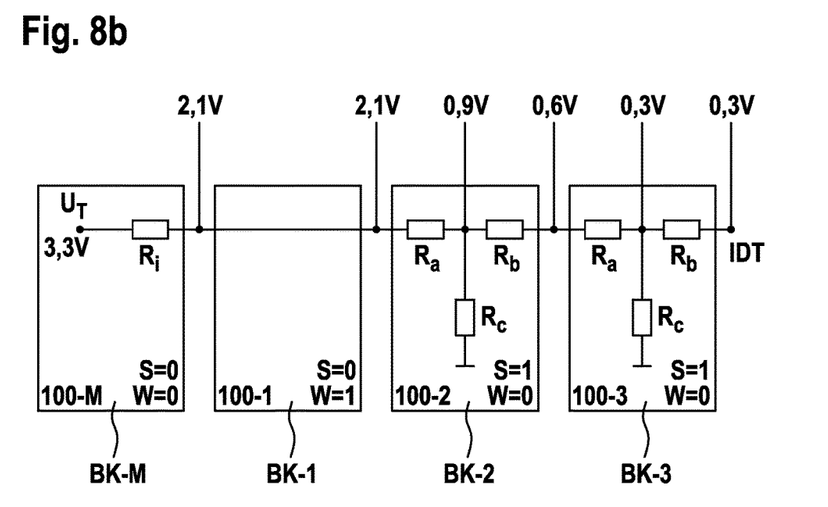
Figure 8C:
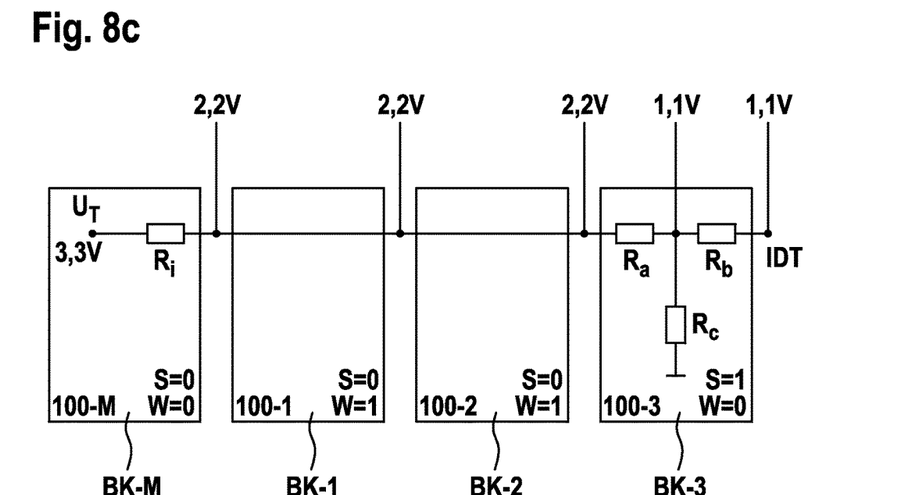
Figure 8D:
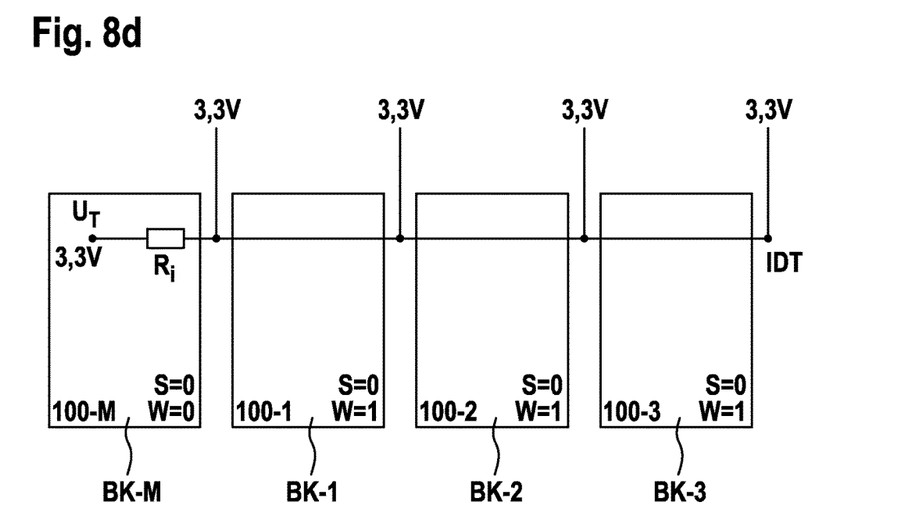

That is, in each of the slave bus nodes, under the control of the respective bus node controller BK-CTRL-1, . . . , BK-CTRL-3, the following takes place: The bus node controllers first, in the respective bus node, close the switch T and the switch W and open the switch S, as shown in FIGS. 7 and 8a.

In the next step, the master bus node controller BK-CTRL-M instructs the transceiver TRX-M to initialize. Next, the master bus node controller BK-CTRL-M controls the switch T for the bus termination unit 200-M in such a way that that bus end formed by the master bus node BK-M is correctly terminated, and controls the switch S at the base point of the T-circuit in such a way that the connection to the reference potential GND is interrupted. Next, the master bus node controller BK-CTRL-M feeds the predetermined voltage (here assumed to be 3.3V) to the center of the T-circuit. As a consequence, the voltage level on the identification line identification unit rises again.

If the bus controller BK-CTRL-M of the master ascertains that Ua and Ub are less than 2.8V, then this is an indication that the master bus node BK-M is not forming a bus end but instead is connected on both sides to a further bus node. In that case, the bus initialization can be discontinued, with an error report accordingly.

Likewise, the bus controller BK-CTRL-M of the master can ascertain that Ua and Ub are greater than 2.8V; that is, that they have finally risen to 3.3V (number 6 in FIG. 9). This is an indication that no further CAN bus nodes are connected. In this case as well, the bus initialization can be discontinued, with an error report accordingly.

If the voltage level on the identification line rises above 1.5V and to approximately 2 to 2.1V, this means that at least one slave bus node, which is connected to the master, has initialized (number 7 in FIG. 9).

In the next step, the master waits for a first message from one of the slave bus nodes BK-1, BK-2, BK-3.

FIG. 8a shows the state of the identification units 100-1, 100-2, 100-3 at number 5 in FIG. 9. Because of the T-circuits that are chained via the identification units, the voltage is distributed among the resistors of the T-circuits in accordance with the known laws of physics. Furthermore, the special configuration of the resistor networks in each quadripole ensures that in a predictable way, precisely at the next closest slave bus node BK-1 (in FIG. 8a) at the IDT input, a voltage level is established which will be above a predeterminable threshold, in this case 1.5V as an example.

In the slave bus node BK-1, the following now takes place: The bus node controller BK-CTRL-1 waits until the voltage Ua at the IDT input is greater than 1.5V (number 8 in FIG. 9). From this, the bus node controller BK-CTRL-1 recognizes that the master BK-M has fed 3.3V to the identification line identification unit, and that all the other slave bus nodes, that is, in this case BK-2 and BK-3, have initialized.

The bus node controller BK-CTRL-1 now instructs the communication unit TRX-1 to initialize.

Next, the bus node controller BK-CTRL-1 checks whether the voltage at the IDT output Ub is equal to the voltage Uc at the center of the T-circuit. If so, then this indicates that the bus node is at the bus end. However, at the bus node BK-1, Ua=2.09V, Uc=0.89V, and Ub=0.56V. That is, Ua is greater than 1.5V and Ub is not equal to Uc; in other words, the bus node BK-1 is not the bus end. Therefore the bus node controller BK-CTRL-1 sends a first message to the master BK-M, in which message the master is informed that the bus node sending this first message is not the last bus node on the bus.

In the master bus node BK-M, the first message is received from the slave bus node BK-1. As a reply, the master bus node BK-M sends a second message to the slave bus node BK-1, which message contains an identifier which the slave BK-1 is supposed to use.

The second message is received in the slave bus node BK-1, and the bus node controller BK-CTRL-1 takes the identifier from the message in order to identify the bus node BK-1 in future communications. Once the bus node BK-1 has received its identifier, the bus node controller BK-CTRL-1 instructs the switch W to close and the switch S to open. As a consequence, the state shown in FIG. 8b ensues. In comparison to FIG. 8a, in the identification unit 100-1 of the slave bus node BK-1, there is now only a direct connection between the IDT input and the IDT output.

Now the bus node controller BK-CTRL-2 becomes active, since there, the voltage at the IDT input Ua is greater than the predetermined threshold of 1.5V (number 8 in FIG. 9). At the bus node BK-2, Ua=2.1V, Uc=0.9V, and Ub=0.6V. That is, Ua is greater than 1.5V and Ub is not equal to Uc; in other words, the bus node BK-2 is not the bus end. Therefore the bus node controller BK-CTRL-2 sends a first message to the master BK-M, in which message the master is informed that the bus node BK-2 sending this first message is not the last bus node on the bus.

In the master bus node BK-M, the first message is received from the slave bus node BK-2 again. As a reply, here again the master bus node BK-M sends a second message to the slave bus node BK-2; this which message contains an identifier that the slave BK-2 is intended to use.

The second message is received in the slave bus node BK-2, and the bus node controller BK-CTRL-2 takes the identifier from the message in order to identify the bus node BK-2 in future communications. Once the bus node BK-2 has received its identifier, the bus node controller BK-CTRL-2 in turn instructs the switch W to close and the switch S to open. As a consequence, the state shown in FIG. 8c ensues. In comparison to FIG. 8b, in the identification unit 100-2 of the slave bus node BK-2, there is now only a direct connection between the IDT input and the IDT output.

Now the bus node controller BK-CTRL-3 becomes active, since there, the voltage at the IDT input Ua is greater than the predetermined threshold of 1.5V (number 8 in FIG. 9). Now the bus node controller BK-CTRL-3 ascertains at the bus node BK-3 Ua=2.1V, Uc=1.1V, and Ub=1.1V. Since Ub is equal to Uc, this indicates that the bus node BK-3 is located at the bus end. Now the bus node controller BK-CTRL-3 first controls the switch T for the bus termination unit 200-3 (FIG. 7) in order to activate it, or in other words to terminate the bus correctly. Then the bus node controller BK-CTRL-3 sends a first message to the master BK-M, in which message the master is informed that the bus node BK-3 sending this first message is the last bus node on the bus CB.

In the master bus node BK-M, this first message is received by the slave bus node BK-3. The master bus node BK-M, as a reply, sends a second message to the slave bus node BK-3, which contains an identifier that the slave BK-3 is supposed to use in future. In addition, the bus node controller BK-CTRL-M also knows that the bus initialization is then concluded, since all the slave bus nodes have received an identifier.

The second message is received in the slave bus node BK-3, and the bus node controller BK-CTRL-3 takes the identifier from the message in order to identify the bus node BK-3 in future communications. Once the bus node BK-3 has received its identifier, the bus node controller BK-CTRL-3 instructs the switch W to close and the switch S to open. As a consequence, the state shown in FIG. 8c ensues. In comparison to FIG. 8c, in all the identification units 100-1, 100-2, 100-3 of the slave bus nodes BK-1, BK-2, BK-3, there is now only a direct connection between the IDT input and the IDT output. Therefore the voltage level on the identification line rises to 3.3V (number 9 in FIG. 9), from which the bus node controller BK-CTRL-M could also have recognized that all the bus nodes BK-1, BK-2, BK-3 have received an identifier; that is, it is not absolutely necessary, in the respective first message, to send a piece of information that indicates to the master whether the sending bus node is located at the bus end.

All the bus nodes can now communicate via the communication bus by means of the identifiers (IDs).

Figure 10:
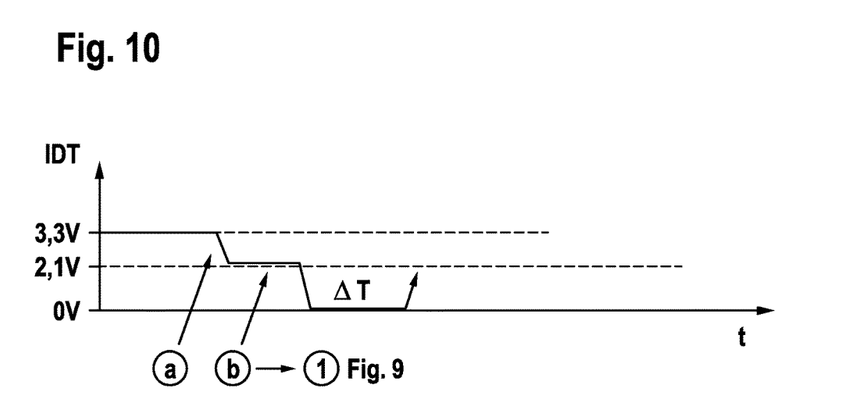
FIG. 10 is a voltage level diagram, which illustrates the voltage level on the identification line when a new bus node is joined to an already-configured bus.

FIG. 10 is a voltage level diagram, which illustrates the voltage level on the identification line identification unit when a new bus node is joined to an already-configured bus.

The bus node controller of a new bus node that does not yet have an identifier can in principle be arranged in such a way that in the identification unit, the quadripole, that is, in the exemplary embodiment the T-circuit, is connected into the identification line. Consequently, by the connection of the slave to the identification line identification unit, its voltage level is pulled from 3.3V to 2.2V (letter a in FIG. 10). The bus node controller BK-CTRL-M of the master bus node BK-M can then be arranged accordingly in such a way that because of this voltage dip, it triggers the bus initialization method. That is, the bus node controller BK-CTRL-M first pulls the voltage level on the identification line identification unit to 0V, in order to put all the slave bus nodes in the initialization state. Next, the procedure explained above in conjunction with FIGS. 7 through 9 is repeated, as a result of which all the bus nodes, depending on their location on the bus, receive an identifier, and the bus at the bus node that forms the bus end is correctly terminated.

In a particular application of the version presented here, components of an X-ray inspection system are connected by means of a CAN bus. To enable communication of the bus nodes, the nodes of the CAN bus system, as explained in detail above, depending on the cabling, are automatically configured with a respective identifier, and the CAN bus in the last bus node, that is, the bus node forming an end of a bus, is automatically terminated.

The invention claimed is:

1. A bus node comprising: a communication unit coupled for communication with at least one data line of a communication bus; a bus node controller operationally coupled to the communication unit; an identification unit coupled to the bus node controller, the identification unit comprising an identification line having an identification line input and an identification line output; a quadripole selectively interposed between the identification line input and the identification line output, the quadripole configured so that, in a serial interconnection from the bus node with at least a second bus node for the bus node controller, a position of the bus node is identifiable via a comparison of a voltage at the identification line input with a predetermined threshold value, the quadripole comprising a T-circuit including a first resistor and a second resistor connected serially to the identification line and a third resistor connected between a connection point of the first resistor to the second resistor and a reference potential; and a bus termination unit connectable by the bus node controller for the at least one communication line; wherein the bus node controller is configured to receive a first signal corresponding to a first voltage at the identification line input, a second signal corresponding to a second voltage at the identification line output and a third signal corresponding to a third voltage at a middle of the T-circuit; and wherein, when the first signal indicates that the first voltage is greater than the predetermined threshold value, the bus node controller is configured to cause the communication unit to send a first message, via the at least one communication line, to a bus master, subsequently receive a second message from the bus master via the at least one communication line, the message containing a unique identifier for the bus node, and communicate via the communication bus, using the identifier; and wherein, when the second signal and the third signal indicate that the second voltage and the third voltage are substantially identical, the bus node controller is configured to activate the bus termination unit for each of the at least one communication line.

2. The bus node as recited in claim 1, wherein
the bus node controller is further configured to insert a piece of information into the first message to the bus master, the piece of information indicating that the bus node is located at one end of the communication bus.

3. The bus node as recited in claim 1, wherein the communication bus comprises a Controller Area Network Bus, and wherein an existing but unused line or an additional line comprises the identification line.

4. A bus system, comprising: a bus node including: a communication unit coupled for communication with at least one data line of a communication bus; a bus node controller operationally coupled to the communication unit; an identification unit coupled to the bus node controller, the identification unit comprising an identification line having an identification ling input and an identification line output; a quadripole selectively interposed between the identification line input and the identification line output, the quadripole configured so that, in a serial interconnection from the bus node with at least a second bus node for the bus node controller, a position of the bus node is identifiable via a comparison of a voltage at the identification line input with a predetermined threshold value, the quadripole comprising a T-circuit including a first resistor and a second resistor connected serially to the identification line and a third resistor connected between a connection point of the first resistor to the second resistor and a reference potential; and a bus termination unit connectable by the bus node controller for the at least one communication line; wherein the bus node controller is configured to receive a first signal corresponding to a first voltage at the identification line input, a second signal corresponding to a second voltage at the identification line output and a third signal corresponding to a third voltage at a middle of the T-circuit; and wherein, when the first signal indicates that the first voltage is greater than the predetermined threshold value, the bus node controller is configured to cause the communication unit to send a first message, via the at least one communication line, to a bus master, subsequently receive a second message from the bus master via the at least one communication line, the message containing a unique identifier for the bus node, and communicate via the communication bus, using the identifier; and wherein, when the second signal and the third signal indicate that the second voltage and the third voltage are substantially identical, the bus node controller is configured to activate the bus termination unit for each of the at least one communication line.

5. The bus system as recited in claim 4, wherein the bus node controller is further configured to insert a piece of information into the first message to the bus master, the piece of information indicating that the bus node is located at one end of the communication bus.

6. The bus node as recited in claim 4, wherein the communication bus comprises a Controller Area Network Bus, and wherein an existing but unused line or an additional line of the Controller Area Network Bus comprises the identification line.

* * * * *